(12) United States Patent
Bennett

(10) Patent No.: US 8,596,398 B2
(45) Date of Patent: Dec. 3, 2013

(54) ALL TERRAIN VEHICLE

(75) Inventor: Jeffrey David Bennett, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 12/272,377

(22) Filed: Nov. 17, 2008

(65) Prior Publication Data

US 2009/0071738 A1   Mar. 19, 2009

Related U.S. Application Data

(63) Continuation-in-part of application No. 12/069,515, filed on Feb. 11, 2008, now Pat. No. 7,845,452.

(60) Provisional application No. 60/930,361, filed on May 16, 2007.

(51) Int. Cl.
    *B62J 25/00* (2006.01)

(52) U.S. Cl.
    USPC ............................................ 180/90.6; 296/75

(58) Field of Classification Search
    USPC .............................. 180/90.6; 296/75; 280/769
    See application file for complete search history.

(56) References Cited

U.S. PATENT DOCUMENTS

| | | |
|---|---|---|
| 3,628,619 A | 12/1971 | Tanaka et al. |
| 4,412,515 A | 11/1983 | Fritzenwenger |
| 4,478,105 A | 10/1984 | Yamamuro et al. |
| 4,484,493 A | 11/1984 | Yamamuro et al. |
| 4,528,870 A | 7/1985 | van Deursen et al. |
| 4,574,652 A | 3/1986 | Shichinohe et al. |
| 4,600,074 A | 7/1986 | Watanabe et al. |
| 4,664,208 A | 5/1987 | Horiuchi et al. |
| 4,666,015 A | 5/1987 | Matsuda et al. |
| 4,696,148 A | 9/1987 | Brace |
| 4,697,665 A | 10/1987 | Eastman et al. |
| 4,722,235 A | 2/1988 | Kumazawa |
| 4,736,652 A | 4/1988 | Shimamoto |
| 4,736,809 A | 4/1988 | Kumazawa |
| 4,784,017 A | 11/1988 | Johnshoy |
| 4,784,018 A | 11/1988 | Okada et al. |
| 4,850,938 A | 7/1989 | Yamada |
| 4,864,891 A | 9/1989 | Takano et al. |
| 4,907,471 A | 3/1990 | Ishimaru |
| 4,950,208 A | 8/1990 | Tomlinson |

(Continued)

FOREIGN PATENT DOCUMENTS

| | | |
|---|---|---|
| GB | 2 189 854 | 11/1987 |
| JP | 59122727 | 12/1982 |

(Continued)

OTHER PUBLICATIONS

The All New Polaris ATP the ATV That Lets You Do More, More Easily catalog, 2003, pp. 1-14, Polaris Sales, Inc., Medina USA.

(Continued)

*Primary Examiner* — Paul N Dickson
*Assistant Examiner* — Timothy Wilhelm
(74) *Attorney, Agent, or Firm* — Faegre Baker Daniels LLP

(57) ABSTRACT

The present disclosure relates to all-terrain vehicles (ATVs) having an ergonomically improved rider footwell and leg well. Specifically, the present disclosure relates to ATVs having an ergonomically designed footwell leg recess to allow the rider's leg to be received therein while standing.

26 Claims, 5 Drawing Sheets

(56) References Cited

U.S. PATENT DOCUMENTS

| | | | |
|---|---|---|---|
| 4,950,213 A | 8/1990 | Morisawa | |
| 4,955,852 A | 9/1990 | Morisawa | |
| 5,088,352 A | 2/1992 | Ishimaru | |
| 5,152,361 A | 10/1992 | Hasegawa et al. | |
| 5,460,575 A | 10/1995 | Berto | |
| 5,515,940 A | 5/1996 | Shichinohe et al. | |
| 5,529,544 A | 6/1996 | Berto | |
| 5,632,354 A | 5/1997 | Kashiwase et al. | |
| 5,699,872 A | 12/1997 | Miyakawa et al. | |
| 5,813,374 A | 9/1998 | Chasteen | |
| 5,946,983 A | 9/1999 | Brambilla | |
| 6,016,943 A | 1/2000 | Johnson et al. | |
| 6,041,877 A | 3/2000 | Yamada et al. | |
| 6,076,624 A | 6/2000 | Izumi et al. | |
| 6,149,540 A | 11/2000 | Johnson et al. | |
| 6,155,371 A | 12/2000 | Izumi | |
| 6,170,597 B1 | 1/2001 | Fukuda | |
| 6,269,899 B1 | 8/2001 | Izumi | |
| 6,270,106 B1 | 8/2001 | Maki et al. | |
| 6,296,073 B1 | 10/2001 | Rioux et al. | |
| 6,478,103 B1 * | 11/2002 | Matsuura | 180/90.6 |
| 6,547,027 B1 * | 4/2003 | Kalhok et al. | 180/312 |
| 6,712,172 B2 | 3/2004 | Inagaki et al. | |
| 6,755,269 B1 | 6/2004 | Davis et al. | |
| 6,767,022 B1 | 7/2004 | Chevalier | |
| 6,892,952 B2 | 5/2005 | Chang et al. | |
| 6,968,917 B2 | 11/2005 | Rondeau et al. | |
| 7,000,931 B1 | 2/2006 | Chevalier | |
| 7,004,484 B1 | 2/2006 | Chevalier | |
| 7,055,454 B1 | 6/2006 | Whiting et al. | |
| 7,163,477 B1 | 1/2007 | Sherrod | |
| D592,557 S * | 5/2009 | Mehra | D12/107 |
| 7,624,829 B2 * | 12/2009 | Kubota | 180/69.4 |
| 2004/0031640 A1 * | 2/2004 | Tweet | 180/311 |
| 2004/0129484 A1 | 7/2004 | Rondeau et al. | |
| 2004/0129485 A1 | 7/2004 | Rondeau et al. | |
| 2004/0206568 A1 | 10/2004 | Davis et al. | |
| 2004/0239088 A1 * | 12/2004 | Rondeau et al. | 280/769 |
| 2005/0173177 A1 | 8/2005 | Smith et al. | |
| 2006/0006623 A1 | 1/2006 | Leclair | |
| 2006/0185927 A1 | 8/2006 | Sakamoto et al. | |
| 2007/0095306 A1 * | 5/2007 | Fujimoto et al. | 123/41.63 |
| 2007/0176386 A1 | 8/2007 | Schlangen et al. | |
| 2007/0193813 A1 | 8/2007 | Schlangen et al. | |
| 2008/0257630 A1 | 10/2008 | Takeshima et al. | |
| 2008/0283327 A1 * | 11/2008 | Dieter et al. | 180/292 |

FOREIGN PATENT DOCUMENTS

| | | |
|---|---|---|
| JP | 62 131808 A | 6/1987 |
| JP | 1-275955 | 11/1989 |
| JP | 2-120132 | 5/1990 |
| WO | WO 2006/110687 A | 10/2006 |

OTHER PUBLICATIONS

The World's Toughest ATVs All-Terrain Vehicles and Accessories 2005 catalog, 2004, pp. 1-25, Polaris Sales, Inc., Medina USA.

The 2006 Polaris ATV Handbook, 2005, pp. 1-44, Polaris Sales, Inc., Medina USA.

Search Report and Written Opinion for PCT/US2008/006097 issued by the European Patent Office on Nov. 25, 2008.

* cited by examiner

ALL TERRAIN VEHICLE

CROSS REFERENCE TO RELATED APPLICATION

This application claims priority to U.S. Utility patent application Ser. No. 12/069,515 filed Feb. 11, 2008 which in turn claims priority from Provisional Patent Application Ser. No. 60/930,361, filed May 16, 2007, both of which are expressly incorporated by reference herein. This application also incorporates by reference, design patent application 29/306,184 filed Apr. 3, 2008.

FIELD OF THE INVENTION

The present disclosure relates to all-terrain vehicles (ATVs) having an ergonomically improved rider footwell and leg well. Specifically, the present disclosure relates to ATVs having an ergonomically designed footwell leg recess to allow the rider's leg to be received therein.

BACKGROUND AND SUMMARY

Generally, ATVs include a frame having a seat about which the rider straddles. An engine is mounted in the frame forward of the seat. Most ATVs also have foot treads or foot wells formed into the chassis of the vehicle, which define platforms flanking the frame and straddle seat, and spaced above ground level. The platforms allow a rider to place their feet on the platforms while riding.

Generally, all terrain vehicles ("ATVs") are used in a recreational sense to carry a driver over a variety of terrain. Due to increasing extreme terrain which riders are often subjected to, riders often stand on the foot wells while riding. While this allows the rider to negotiate the terrain with more ease, the present ATVs do not provide for an ergonomically comfortable ride while in the standing position.

According to an illustrative embodiment of the present disclosure, an all terrain vehicle (ATV) comprises a frame; a plurality of wheels supporting the frame above the ground; a straddle type seat attached to the frame; a chassis attached to the frame and forms at least a portion of the body, where the chassis comprises a foot tread for a driver's feet, and a rear wall, the rear wall extending generally vertically and upwardly, the rear wall conforming to receive at least a portion of the driver's leg.

In accordance with another embodiment of the invention, an all terrain vehicle (ATV) comprises a frame; a plurality of wheels supporting the frame above the ground; a straddle type seat attached to the frame; a foot tread positioned on opposite sides of the straddle type seat for a driver to place their feet, and a rear wall extending generally vertically and upwardly from each foot tread, each rear wall conforming to receive at least a portion of the backs of the driver's leg.

The above mentioned and other features of this invention, and the manner of attaining them, will become more apparent and the invention itself will be better understood by reference to the following description of embodiments of the invention taken in conjunction with the accompanying drawings.

Figure 1:
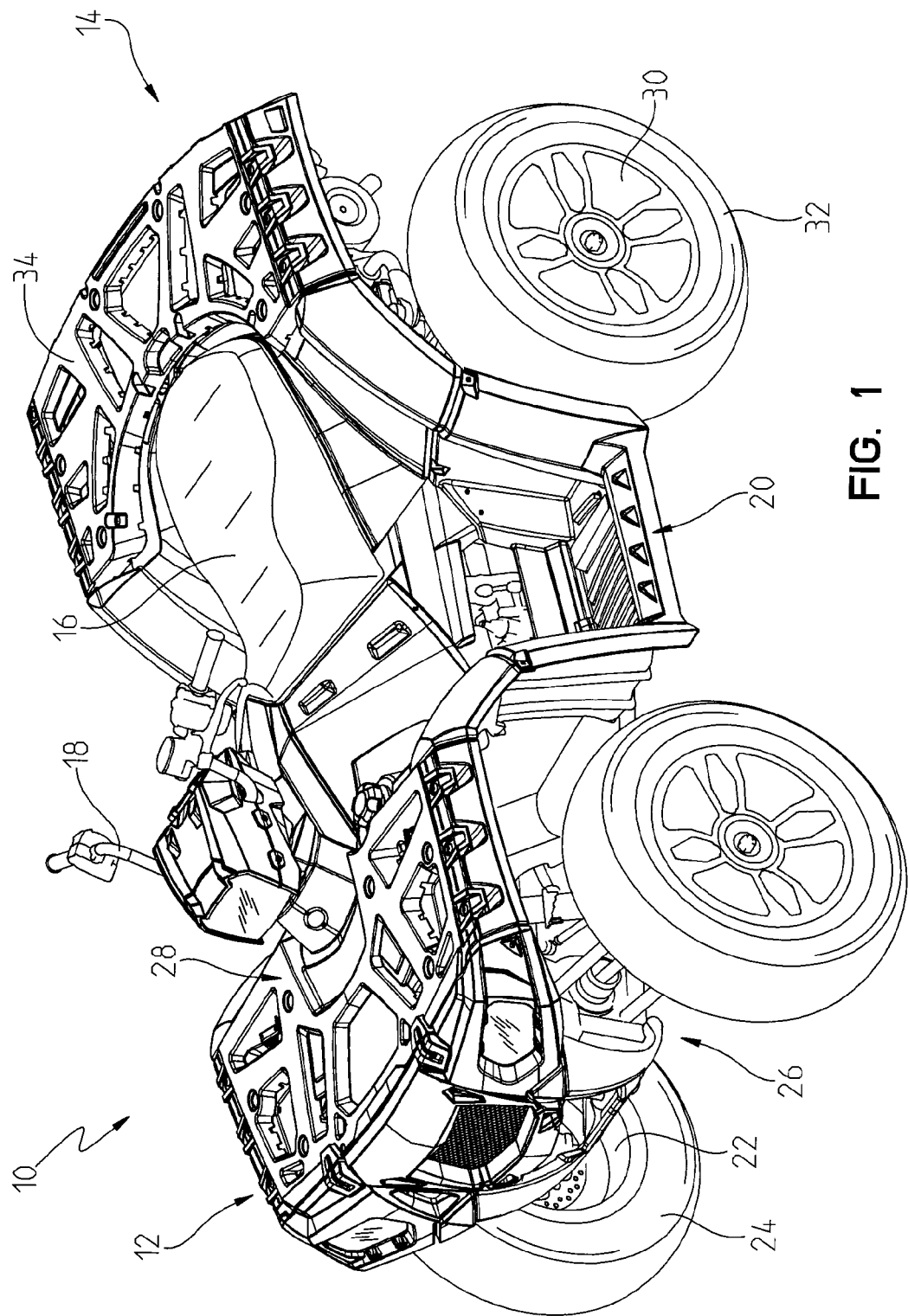
FIG. 1 is a perspective view of an ATV in accordance with illustrative embodiments of the present invention.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to an all terrain vehicle, it should be understood that the invention may have application to other types of vehicles, such as snowmobiles, motorcycles, watercraft, utility vehicles, scooters, golf carts, and mopeds.

Figure 2:
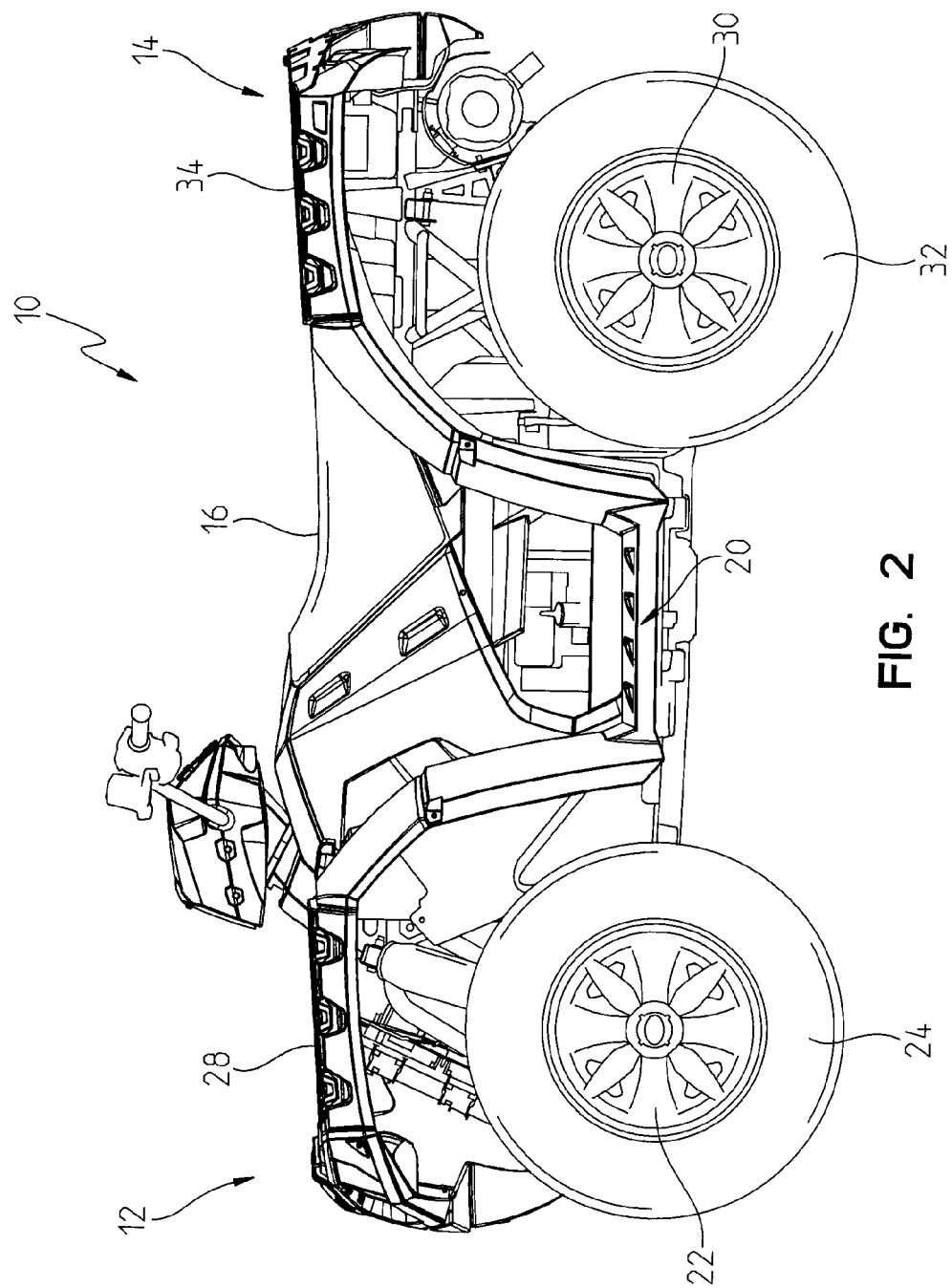
FIG. 2 is a left side view of the ATV shown in FIG. 1.

Referring initially to FIGS. 1 and 2, one illustrative embodiment of an all terrain vehicle (ATV) 10 is shown. ATV 10 includes front end 12, rear end 14, straddle-type seat 16, and handlebar assembly 18. Front end 12 and rear end 14 are separated by footwells 20 on both lateral sides of ATV 10 and separated by seat 16. Front end 12 is supported by front wheels 22 and tires 24 and front suspension 26. Front end 12 also includes front panel 28 which may include a tool storage compartment. Handlebar assembly 18 is operably coupled to front wheels 22 to allow a rider to steer ATV 10 when supported by seat 16 and/or footwells 20. Rear end 14 is supported by rear wheels 30, tires 32 and a rear suspension (not shown). Rear end 14 also includes rear panel 34 which may include a tool storage compartment. Front panel 28 and rear panel 34 may also include an accessory coupling system such as the one disclosed in U.S. Pat. No. 7,055,454, the disclosure of which is expressly incorporated by reference herein.

Figure 3:
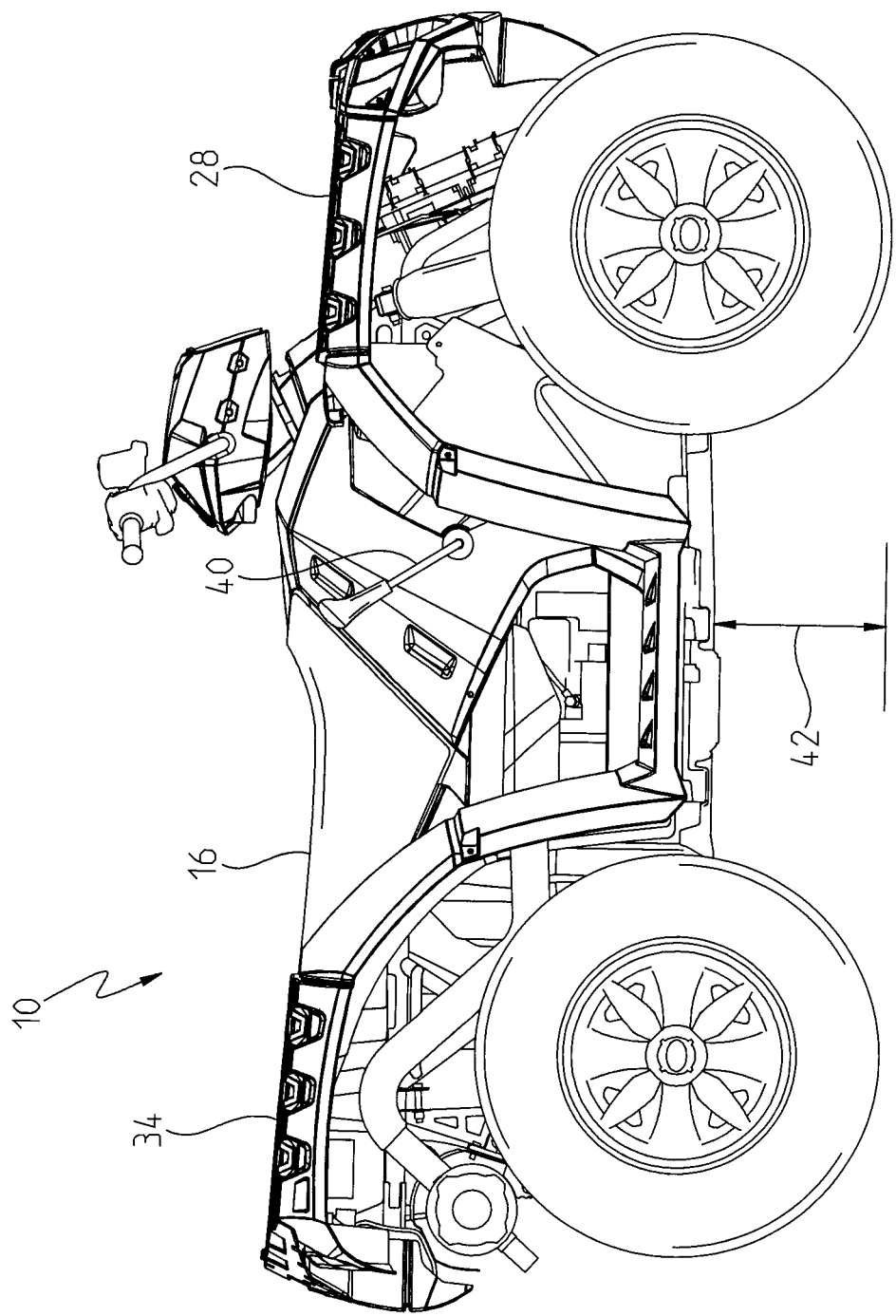
FIG. 3 is a right side view of the ATV shown in FIG. 1.

In this illustrative embodiment, and as further detailed herein, front wheels 22 and rear wheels 30 have outer diameters equal to about 355 millimeters (about 14 inches). Tires 24 and 32 may be constructed to any suitable size and pressure rating, however for the illustrative embodiment, front tires 24 are 26×8R-14 tires (i.e., having an inflated outer diameter of about 660 millimeters (about 26 inches) and an inflated width of about 203 millimeters (about 8 inches)), and rear tires 32 are 26×10R-14 tires (i.e., having an inflated diameter of about 660 millimeters (about 26 inches) and an inflated width of about 254 millimeters (about 10 inches)). Both front tires 24 and rear tires 32 are low pressure tires, illustratively operated at a maximum air pressure of about 7 pounds per square inch (about 0.5 Kg/CM$^2$). For the illustrative embodiment, tires 24 and 32 provide a significant amount of suspension for ATV 10. Front tires 24 extend forward of forwardmost components of ATV 10, illustratively front panel 28, and may act as a front "bumper" for ATV 10. As such, front tires 24 are configured to prevent damage to ATV 10 or a transporting vehicle, especially if ATV 10 is transported in a pickup truck bed or similar vehicle. Referring now to FIG. 3, shift lever 40 is shown on the right side of ATV 10 and is coupled to a transmission of ATV, which is described in greater detail U.S. patent application Ser. No. 12/069,515 and incorporated herein by reference.

Figure 4:
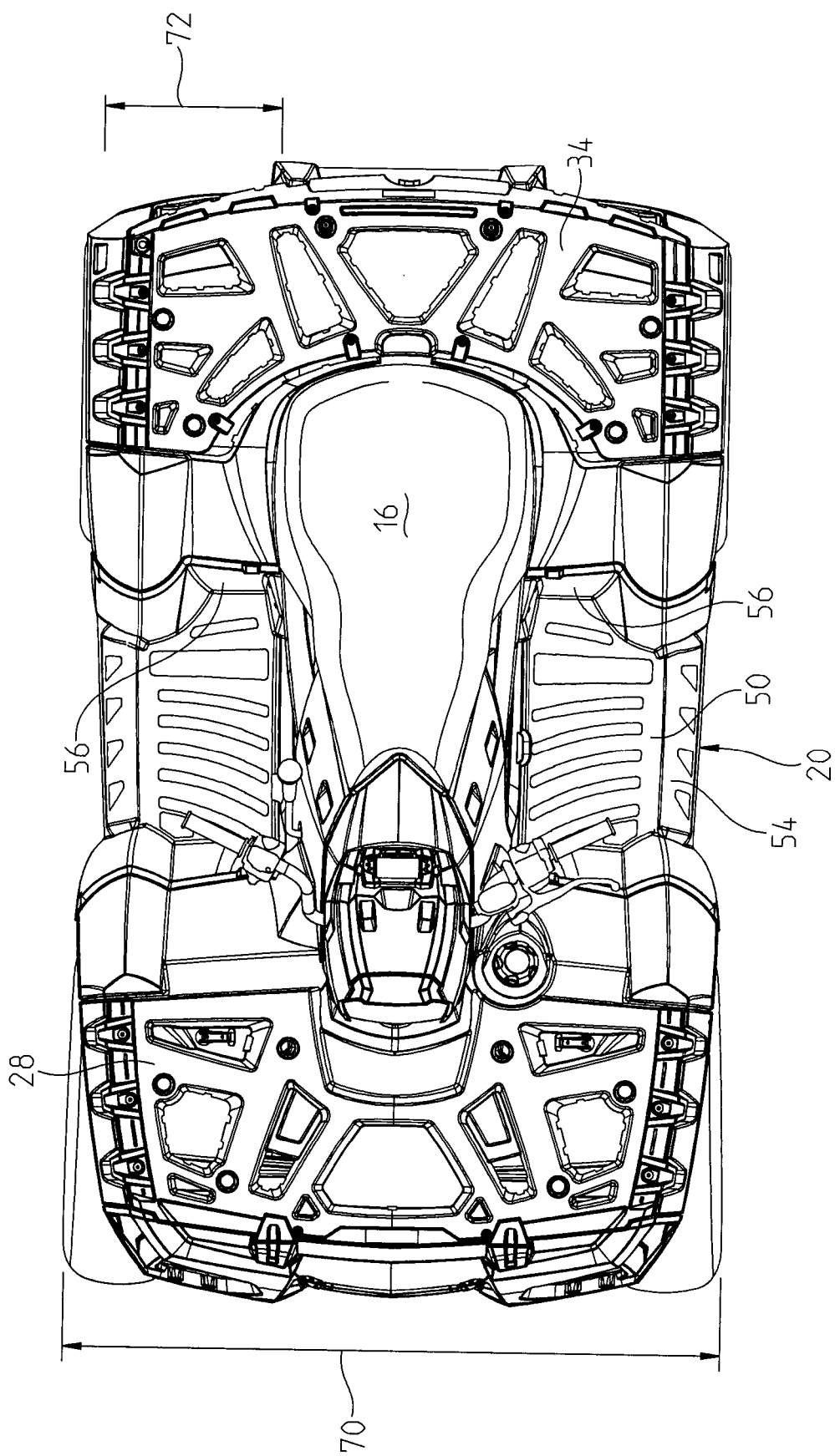
FIG. 4 is a top plan view of the ATV shown in FIG. 1.
Figure 5:
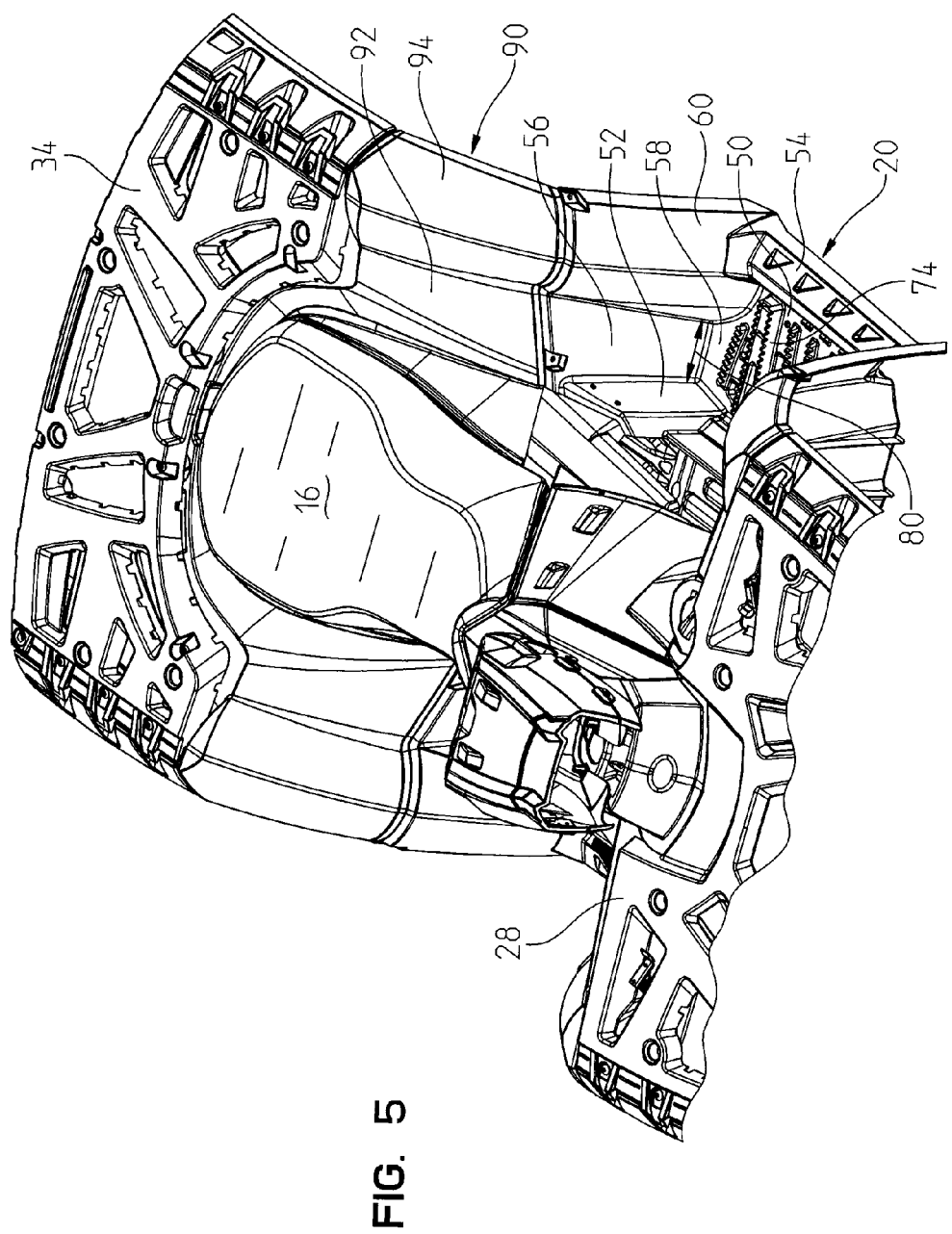
FIG. 5 is a top perspective view of the footwell, chassis and straddle seat, in partial fragmentation.

With respect now to FIGS. 4 and 5, footwells 20 are comprised of a floor 50 which extends between an inner wall 52 and an outer marginal wall 54. The footwell 20 further includes a rear wall 56 which defines a recess or concavity 58 which is bounded by inner wall 52 and an outer protrusion defined as a semi-cylindrical wall 60. As shown best in FIG. 4, a rear wall 56 is positioned on each side of straddle seat 16 and while extending generally vertically upwardly, rear walls 56 extend slightly rearwardly.

With reference now to FIGS. 3 and 4, distance 42 illustrates ground clearance of ATV 10. In this illustrative embodiment, distance 42 is equal to about 305 millimeters (about 12 inches). FIGS. 4 and 5 illustrate a top view of ATV 10. Distance 70 is the overall width of ATV 10. In this illustrative embodiment, distance 70 is defined to be less than 1219 millimeters (approximately 48 inches), and is illustratively equal to about 1206.5 millimeters (about 47.5 inches). Distance 72 is equal to the width of footwells 20 on both lateral sides of ATV 10. In this illustrative embodiment, distance 72 is about 330 millimeters (about 13 inches) measured as from proximate center portion sidewall 52 to outer margin 54 of each respective footwell 20. Referring to FIG. 4, the width of ATV 10 between inner edges 52 of footwells 20 is about 421.6 millimeters (about 16.6 inches).

As may be appreciated, the ratio of the lateral distance between inner walls 52 of footwells 20 and the lateral distance between the outer margins 54 of footwells 20 is equal to approximately 0.64, and is illustratively less in order to provide a narrower straddle width 44 for the rider. The distance between inner edges 52 is the distance a rider positioned on seat 20 will straddle. It may be preferable for a rider to straddle seat 16 in the seated position with both feet resting in footwells 20. Footwells 20 include traction devices 74 to contact a rider's footwear.

As shown most clearly in FIG. 5, rear wall 56 is defined to ergonomically receive the rider's leg. Rear wall in the illustrated embodiment, has a lower dimension of approximately four (4) inches. This dimension is adequate to receive the riders shoe or boot up against the rear wall 56, and yet still be nested between the side wall 52 and protrusion 60. In this way, a rider may stand up on the footwells 20, with their boot in the recess 58, and their calves up against the rear wall 56. The ratio of the rear wall 56 (dimension 80) is approximately 31% (4/13) of the total width of the footwell (dimension 72) and therefore there is a substantial area for the driver to plant their feet on the footwell and yet place there calves within the concavity providing a secure feeling while standing.

As also shown best in FIG. 5, a further chassis portion 90 is provided, having a rear wall portion 92 which conforms to rear wall 56, and further includes a protrusion 94 which conforms to protrusion 60. Footwell 20 and chassis portion 90 extend upwardly and merge into, and with, rear platform 34.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An all terrain vehicle (ATV) comprising:
a frame;
a plurality of wheels supporting the frame above the ground;
a straddle type seat attached to the frame;
a chassis attached to the frame and forming at least a portion of the body, the chassis comprising:
a foot tread for a driver to place their feet,
a rear wall extending generally vertically and upwardly from the foot tread, the rear wall being projected generally forwardly;
an inner side wall positioned adjacent an inner end of the rear wall and extending forwardly from the rear wall; and
a protrusion which extends vertically and upwardly, an outer edge of the protrusion being substantially adjacent an outside edge of the foot tread, the rear wall at the intersection of the foot tread being less than the width of the foot tread and a forward-most end of the protrusion extending forward of the rear wall and the inner wall to define a concavity conforming to receive at least a portion of the driver's leg.

2. The ATV of claim 1, wherein the rear wall forms a portion of the wheel well around the rear wheel.

3. The ATV of claim 1, wherein the rear wall extends rearwardly and upwardly.

4. The ATV of claim 1, wherein the concavity is intermediate the protrusion and the straddle type seat.

5. The ATV of claim 4, wherein the concavity is laterally positioned adjacent to the straddle seat.

6. The ATV of claim 5, wherein the inner side wall extends transverse to the rear wall and extends upwardly towards the straddle type seat.

7. The ATV of claim 6, wherein the concavity is flanked by the inner side wall and a semi-cylindrically shaped wall.

8. The ATV of claim 7, wherein the inner side wall and semi-cylindrically shaped wall extend upwardly to a rear platform.

9. The ATV of claim 8, wherein the rear platform is a rack positioned rearwardly of the straddle type seat.

10. The ATV of claim 4, wherein the foot tread extends into the concavity.

11. The ATV of claim 1, wherein the rear wall is less than half the width of the foot tread.

12. The ATV of claim 11, wherein the rear wall is approximately 30% of the width of the foot tread.

13. The ATV of claim 1, wherein the length of the protrusion in a longitudinal direction, is at least approximately equal to the width of the rear wall.

14. The ATV of claim 1, wherein each rear wall defines a nested recess having a depth defined in a longitudinal axis which is substantially equal to a width of the rear wall defined in a lateral axis and conforms to receive at least a portion of the backs of the driver's leg.

15. An all terrain vehicle (ATV) comprising:
a frame;
a plurality of wheels supporting the frame above the ground;
a straddle type seat attached to the frame;
a foot tread on opposite sides of the straddle type seat for a driver to place their feet, and
a rear wall extending generally vertically and upwardly from each foot tread, and
a protrusion which extends vertically and upwardly, the protrusion being spaced forwardly of the rear wall, each rear wall defining a nested recess having a depth defined in a longitudinal axis between a front of the protrusion and the rear wall which is substantially equal to a width of the rear wall defined in a lateral axis and conforming to receive at least a portion of the backs of the driver's leg.

16. The ATV of claim 15, wherein the rear wall forms a portion of the wheel well around the rear wheel.

17. The ATV of claim 15, wherein the rear wall extends rearwardly and upwardly.

18. The ATV of claim 15, wherein the conforming rear walls are defined by a concavity.

19. The ATV of claim 16, wherein the concavities are laterally positioned adjacent to the straddle seat.

20. The ATV of claim 19, wherein the chassis is provided with inner side walls which extend transverse to the rear wall and extend upwardly to the straddle type seat.

21. The ATV of claim 20, wherein the concavities are flanked by the inner side wall and the protrusion is defined by a semi-cylindrically shaped wall.

22. The ATV of claim 21, wherein the inner side wall and semi-cylindrically shaped wall extend upwardly to a rear platform.

23. The ATV of claim 22, wherein the rear platform is a rack positioned rearwardly of the straddle type seat.

24. The ATV of claim 15, wherein the foot tread extends into the concavity.

25. The ATV of claim 15, wherein the rear wall is less than half the width of the foot tread.

26. The ATV of claim 25, wherein the rear wall is approximately 30% of the width of the foot tread.

\* \* \* \* \*